(12) United States Patent
Assarpour

(10) Patent No.: US 9,608,841 B2
(45) Date of Patent: Mar. 28, 2017

(54) METHOD FOR REAL-TIME SYNCHRONIZATION OF ARP RECORD IN RSMLT CLUSTER

(75) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 1341 days.

(21) Appl. No.: 12/950,304

(22) Filed: Nov. 19, 2010

(65) Prior Publication Data

US 2011/0317700 A1 Dec. 29, 2011

Related U.S. Application Data

(60) Provisional application No. 61/359,076, filed on Jun. 28, 2010.

(51) Int. Cl.
*H04L 12/28* (2006.01)
*H04L 12/46* (2006.01)
*H04L 12/741* (2013.01)
*G06F 9/32* (2006.01)

(52) U.S. Cl.
CPC .......... *H04L 12/4625* (2013.01); *H04L 45/54* (2013.01); *G06F 9/32* (2013.01); *G06F 9/322* (2013.01)

(58) Field of Classification Search
None
See application file for complete search history.

(56) References Cited

U.S. PATENT DOCUMENTS

2007/0150614 A1\* 6/2007 Ramachandran et al. .... 709/238

\* cited by examiner

*Primary Examiner* — Nicholas Sloms (57) ABSTRACT

Embodiments herein include systems and methods for providing a mechanism for efficient data synchronization of ARP records between two peer nodes of an SMLT system. Such techniques include modifying control information of ARP packets transmitted between peer nodes of the SMLT system to indicate originating SMLT ports. Techniques also include disabling MAC synchronization control messaging across the IST link. These techniques enable real-time synchronization ARP records for MAC learning without needing dedicated control messaging over the IST, thereby providing nodal and SMLT port failover and recovery.

13 Claims, 6 Drawing Sheets

PRIOR ART

FIG. 4  TO STEP 340 IN FIGURE 5

METHOD FOR REAL-TIME SYNCHRONIZATION OF ARP RECORD IN RSMLT CLUSTER

CROSS REFERENCE TO RELATED APPLICATIONS

The present application claims the benefit of U.S. Provisional Patent Application No. 61/359,076 filed on Jun. 28, 2010, entitled "Method and Apparatus for Processing Packets," which is incorporated herein by reference in its entirety.

BACKGROUND

The present disclosure relates to network computing. Computer networks typically include a collection of computing devices enabled to communicate with each other for handling data traffic and control instructions. For example, such devices can include servers, data centers, routers, network switches, bridges, hubs, management applications, wireless access points, and client computers. Computer networks can provide network connectivity to wired computing devices and/or wireless computing devices. Some network computing devices, such as network switches, are used to connect network segments. Network switches process data, such as data packets, and forward the data to and from source and destination devices. Network switches can also include functionality for routing data in addition to forwarding operations.

Computer networks can include various configurations. One such configuration includes a link aggregation technology known as Multi-Link Trunking (MLT). MLT is a port trunking or line/cable sharing technology for using multiple network connections in parallel. MLT has been standardized as specified by Institute of Electrical and Electronics Engineers (IEEE) 802.3ad, which is hereby incorporated by reference. MLT typically includes Link Aggregation Control Protocol (LACP) to provide a method to control the bundling of several physical ports together to form a single logical channel. LACP allows a network device to negotiate an automatic bundling of links by sending LACP packets to a peer (directly connected device that also implements LACP). Alternatively, MLT links can be bundled manually. In both configurations, MLT enables grouping several physical Ethernet links into one logical Ethernet link to provide increased bandwidth, speed, resiliency, and several fail-over paths for fault-tolerance. If a given link fails, then the MLT technology will quickly and automatically redistribute traffic across the remaining links.

MLT is generally limited in that the physical ports in a given link aggregation group all reside on the same network switch. Additional MLT technologies address this limitation by enabling physical ports to be split between two network switches. Such technologies that enable splitting physical ports between network switches include Split Multi-Link Trunking (SMLT), Distributed Split Multi-Link Trunking (DSMLT), and Routed Split Multi-Link Trunking (R-SMLT). By splitting physical ports between network switches, split multi-link trunking technologies protect against nodal failure in addition to line card and link failure.

SUMMARY

Conventional mechanisms for providing split multi-link trunking technologies have challenges. One specific challenge relates to synchronization of data between two network switches (nodes) of a split multi-link trunk. To protect against nodal failure, split multi-link trunking provides a dual-homed solution that uses two nodes that connect to a given edge device or access network. Split multi-link trunking essentially defines a group of physical ports and treats the group of physical ports as one logical port, with one or members or physical ports of the logical port one each node. Because the single logical port is shared by two nodes that are physically separated, forwarding databases associated with each node need to be synchronized for accurate data processing.

The two nodes in an SMLT system are physically connected by a special trunk called inter-switch trunk (IST). SMLT embodiments can also be configured as clusters of nodes with IST links between clusters. The IST is used for control messaging between the two nodes and synchronization of databases, but can also be used for data traffic when needed. Typically, a given data packet received at a first node on an SMLT port is forwarded on a local member port on the first node. If this local member port (destination port) fails, however, then the given packet can be transmitted across the IST port to be forwarded by the peer node. In other words, the IST link is primarily used for control messaging, but can also be used for data traffic (packet switching) during failure scenarios or high-volume situations. Broadcast data and IP multi-cast packets are typically transmitted across the IST link regardless of whether there is a failure at the first node, due to the broadcast nature.

One concern with SMLT/DSMLT/RSMLT systems is to make sure the Layer 2 and Layer 3 protocols work properly. Layer 2 refers to the Data Link Layer of the Open Systems Interconnection (OSI) model of computer networking, while Layer 3 refers to Network Layer of the OSI model. The two nodes of an SMLT system appear as a virtual box that has an SMLT identification (ID) or group number that is global across both nodes, that is, the SMLT has a virtual ID. Accordingly, it is important that Layer 2 and Layer 3 protocols work properly to avoid transmission loops.

Many Layer 3 protocols rely on Layer 2 protocols. That is, some protocols use Layer 2 protocols to disseminate information such as Address Resolution Protocol (ARP). Address Resolution Protocol (ARP) is a computer networking protocol used to determine a Link Layer or hardware address of network devices when only an Internet Layer (IP) or Network Layer address is known. In other words, ARP is a protocol for determining a client's Media Access Control (MAC) address when only the IP address is known. ARP packets are typically transmitted as a broadcast, and thus would be a type of data packet that is forwarded across the IST. ARP packets are typically queries and responses or replies to specific queries, but ARP packets can also include MAC address advertisements or gratuitous notifications. ARP is a standardized protocol specified by Request for Comments (RFC) 826 of the Internet Engineering Task Force (IETF), which is herby incorporated by reference.

One important required function in an SMLT/RSMLT cluster is to synchronize ARP and MAC records across the IST peer switch node. Even though there is essentially (logically) a single virtual switch, there are still two functioning control planes that are simultaneously active and learning. Consequently, periodically the control planes need to synchronize their respective databases on SMLT ports. For example, if one peer node has learned a MAC address on an SMLT port, then this MAC learning needs to be synchronized with the other peer node. Conventionally, such synchronization occurs across the IST port via transmission of dedicated control messages, such as messages with a payload generated by the control plane and sent to a peer node. This function is important to both nodal and SMLT port failover and recovery. For example, if a port dies or if a node dies, then the failover is very quick. While such failures are rare, the failure can be catastrophic. Hence, it is important to minimize any impact of a network crash. Inefficient control messaging over the IST link can lead to overloading the remote node control plane CPU.

Figure 1:
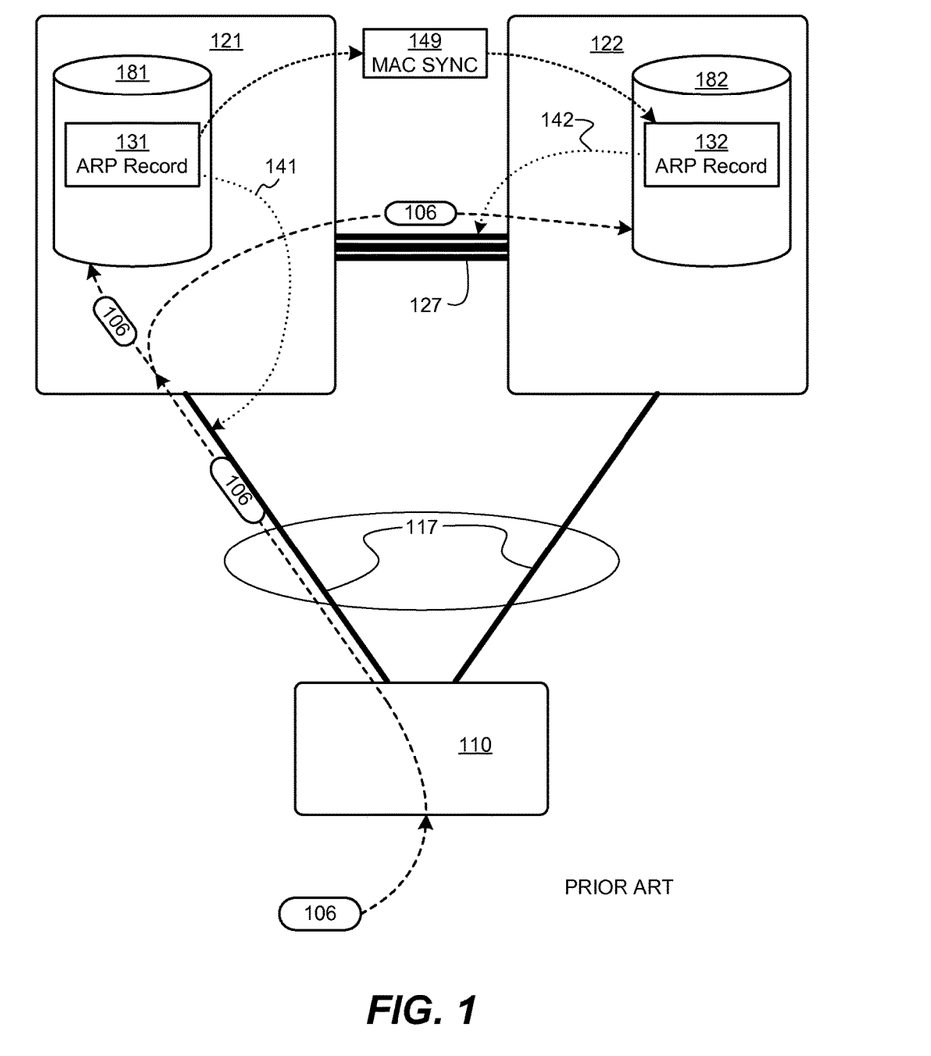
FIG. 1 is network diagram of ARP record synchronization according to conventional techniques.

ARP synchronization involves examining all associated records and updating data paths. Such processing is not a trivial operation. FIG. 1 illustrates the conventional approach to ARP synchronization in an SMLT cluster. An ARP request packet 106 is received at edge node 110. Edge node 110 then selects SMLT trunk 117 on which to forward ARP packet 106. Edge node 110 can use a hashing operation for path or physical port selection. In this particular example, edge node 110 determines to send the ARP packet 106 to node 121 instead of node 122.

Upon receiving the ARP request packet 106, a forwarding data unit of node 121—recognizing that ARP packet 106 was received on SMLT port 117—sends a copy of the ARP packet to its control plane. In addition to sending a copy of packet 106 to the control plane, node 121 forwards packet 106 to all ports on a corresponding VLAN or subnet, as part of the ARP packet being a broadcast type of packet. IST link 127 is a part of such broadcast transmissions. Accordingly, a copy of packet 106 is transmitted across IST link 127 to node 122, and to control plane of node 122 in turn.

The control plane of each node processes the received packet to create a record, as part of a MAC learning process, based on information contained in the received ARP request packet. This MAC learning process also involves identifying ports, that is, identifying a port from which data packets are received. For example, when node 121 creates an ARP record for packet 106, node 121 recognizes that packet 106 was received on SMLT port 117 and creates ARP record 131 within forwarding database 181. This is because the forwarding data unit passes the SMLT port information along with the ARP request packet. Such an ARP record points to SMLT port 117, as represented by line 141, which created record is an accurate record. The problem, however, relates to MAC learning on node 122. Node 122 does not know the original port on which packet 106 was received. Instead, node 122 simply recognizes that packet 106 was received on IST port 127, and does not know whether packet 106 was originally received from an SMLT port or a non-SMLT port. Consequently, when node 122 creates ARP record 132 in forwarding database 182, the ARP record 132 points to IST port 127 (as represented by line 142) instead of SMLT port 117. In other words, ARP record 132 is not synchronized with ARP record 131. At this point, node 122 needs to wait until execution of MAC synchronization before node 121 is synchronized with node 122.

With conventional synchronization, node 121 sends a MAC synchronization message 149 to node 122, indicating a new MAC address, along with the incoming SMLT port information learned at node 121, as IST control (synchronization) message 149. The control plane of node 122 then needs to linearly search through all stored records for that port, find the corresponding ARP entry with that MAC address, and then reset the record to point to SMLT port 117 instead of the IST port 127. Node 122 then has to perform an associative search of the ARP record database based on the learned MAC address. This means every ARP record whose MAC address matches is set to point to the proper SMLT port instead of the IST port. Such a linear search can represent a significant processing burden and time loss. Depending upon a given node's database, such synchronization can take several seconds to several minutes. If a failure happens during synchronization (such as a failure of the SMLT port) then the affected node needs to access all data paths and remove every ARP record entry that previously pointed to the SMLT port to modify the records to point to IST port 127. This is a scalability issue. For example, if a given node has learned 50,000 MAC addresses, then the node has to linearly search through 50,000 MAC addresses pointing to the failed SMLT port, to point to the IST port 127, which may take a considerable amount of time. During this time any MAC synchronization packets sent will be dropped.

Techniques disclosed herein include systems and methods for providing efficient data synchronization of ARP records between two peer nodes of an SMLT system. Such techniques include tagging ARP packets between peer nodes to indicate originating SMLT ports, and disabling MAC synchronization control messaging across the IST link.

In one embodiment, a synchronization manager process is included with a device that provides packet switching and routing in a computer network configured with split multi-link trunking. The synchronization manager receives an Address Resolution Protocol (ARP) data packet at a first data switching device. The ARP data packet is received via a Split Multi-Link Trunking (SMLT) port of the first data switching device, that is, the ARP data packet is transmitted across a member line of the SMLT port. The synchronization manager creates a record of the ARP data packet in a forwarding database of the first data switching device. This record indicates a Media Access Control (MAC) address linked to the SMLT port (virtual port ID) for data forwarding operations. The MAC address in the record is identified from inspection of the ARP data packet. In other words, the ARP record stores a MAC address as pointing to a receiving port. The synchronization manager modifies control information of a copy of the ARP data packet. For example, the synchronization manager modifies packet headers, trailers, or other meta data. The modified control information indicates that the copy of the ARP data packet was received via the SMLT port. The synchronization manager or first switching device then forwards the copy of the ARP data packet (having the modified control information) to a second data switching device via an Inter-Switch Trunk (IST) port.

In another embodiment, the synchronization manager receives a second ARP data packet at the first data switching device. This second ARP data packet is received from the second data switching device via the IST port. The second ARP data packet includes control information modified by the second data switching device such that the modified control information indicates that the second ARP data packet was received via the SMLT port. Note that the second ARP data packet was first received at a member line of the SMLT port at the second switching device. The SMLT port ID is the same regardless of whether a data packet is received at the first switching device or the second switching device. The synchronization manager then creates a record of the second ARP data packet in the forwarding database of the first data switching device. The record of the second ARP data packet indicates a second Media Access Control (MAC) address linked to the SMLT port for data forwarding operations. The second MAC address identified from inspection of the second ARP data packet. Accordingly, with SMLT receiving port information included in a tag of the second ARP data packet, there is no need for either switching device to send separate synchronization control messages across the IST. The synchronization manager can then disable MAC synchronization messaging across the IST link.

Yet other embodiments herein include software programs to perform the steps and operations summarized above and disclosed in detail below. One such embodiment comprises a computer program product that has a computer-storage medium (e.g., a non-transitory, tangible computer readable storage media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting operations such as: receiving an Address Resolution Protocol (ARP) data packet at a first data switching device, the ARP data packet received via a Split Multi-Link Trunking (SMLT) port of the first data switching device; creating a record of the ARP data packet in a forwarding database of the first data switching device, the record indicating a Media Access Control (MAC) address linked to the SMLT port for data forwarding operations, the MAC address identified from inspection of the ARP data packet; modifying control information of a copy of the ARP data packet, the modified control information indicating that the copy of the ARP data packet was received via the SMLT port; and forwarding the copy of the ARP data packet, having the modified control information, to a second data switching device via an Inter-Switch Trunk (IST) port. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting packet switching, routing, and data transport across a communication network. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein include systems and methods that provide efficient data synchronization of ARP records between two peer nodes of an SMLT system. Such techniques include tagging ARP packets between peer nodes to indicate originating SMLT ports, and disabling MAC synchronization control messaging across the IST link. These techniques enable real-time synchronization of ARP records for MAC learning without needing dedicated control messaging over the IST.

Figure 2:
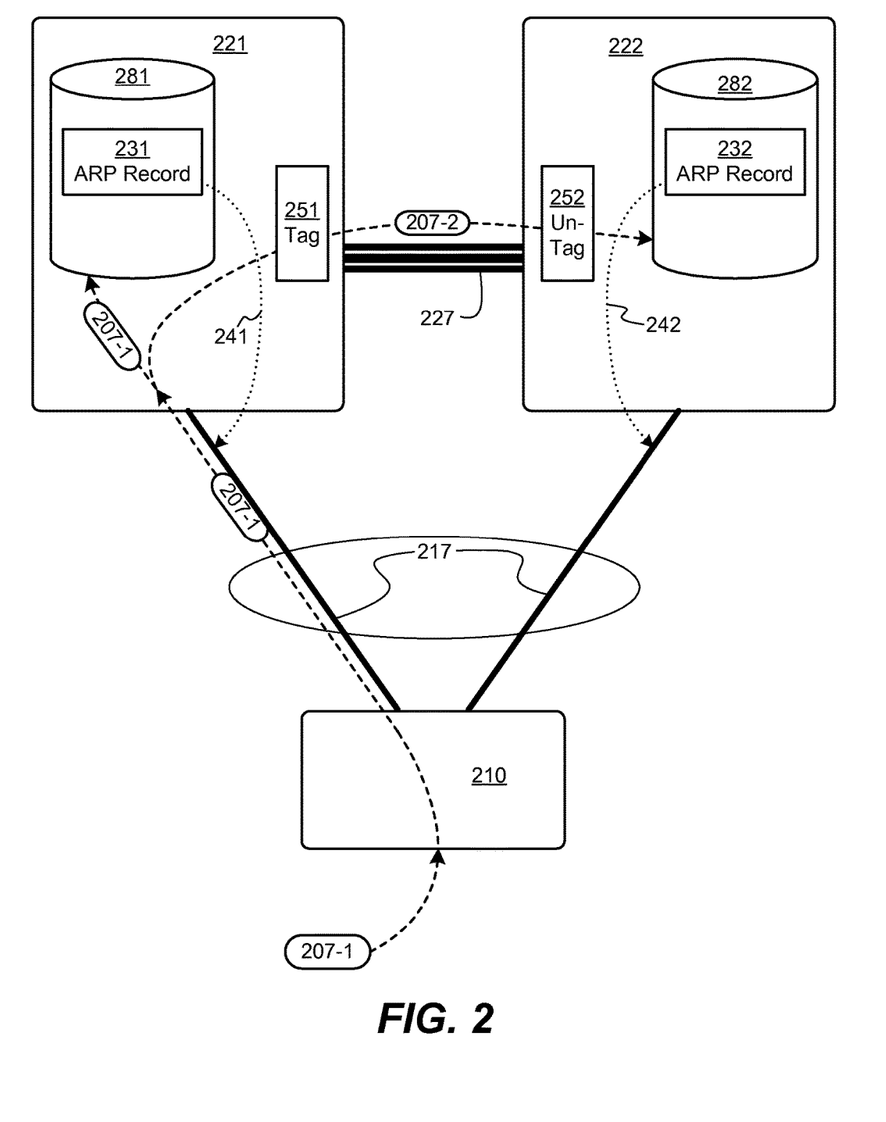
FIG. 2 is a network diagram of real-time synchronization of ARP records in an SMLT/RSMLT cluster, according to embodiments herein.

FIG. 2 illustrates techniques for providing real-time synchronization of ARP records in SMLT/RSMLT clusters. ARP packet 207-1 is transmitted to edge device 210 from a given host or client device either directly or via an access network. Edge device 210 then determines to forward ARP pack 207-1 along SMLT port 217. Note that SMLT port 271 has two physical member lines or ports (physical paths), both of which share the same virtual ID, but one line is physically connected to node 221 and the other line is physically connected to node 222. Edge device 210 can use any decision process, such as a hash process, to select a member line of SMLT port 217. In this example, edge device 210 selects the member of SMLT 217 that attaches to node 221, and then transmits or forwards ARP packet 207-1 along the selected line of SMLT 217.

The synchronization manager then receives ARP data packet at node 221. Node 221 then sends a copy of the ARP packet 207-1 to the CPU control plane, which includes a routing/forwarding database 281. Because node 221 inherently identifies a correct incoming SMLT port ID, the corresponding ARP record 231 is correct, meaning that ARP record 231 accurately points to SMLT port 217, as represented by line 241.

An ARP data packet, in general, is a broadcast packet, which means that node 221 will broadcast ARP packets to appropriate VLANS, to the local control plane, and to a corresponding IST peer node over the IST link. When node 221, however, initiates sending a copy of the ARP packet 207-1 over IST 227, on the egress, node 221 intercepts packet 207-1 in the data path (in hardware) and identifies whether the packet originated from the SMLT port 217 and is headed to the IST port 227. If identified as such, then node 221 tags (251) the packet resulting in ARP data packet 207-2. A tagging or modification operation can include inserting another EtherType tag or other header or special tag/label that indicates or references the SMLT ID. Tagging packet 207-2 includes indicating or identifying the source SMLT port 217. As a tag insertion operation, original packet user data (payload) remains intact. Node 221 then transmits tagged ARP packet 207-2 to node 222.

Upon receiving tagged ARP packet 207-2, node 222 recognizes the special tag, extracts SMLT port information from the packet, removes the tag (un-tags 252) and reconstructs packet 207-2 as if ARP data packet 207-2 were received at node 222 via SMLT port 217. That is, node 222 restores ARP data packet format to the original ARP request packet 207-1, and finally broadcasts the restored ARP request packet into the appropriate VLAN. As part of the VLAN broadcast, a copy of the packet along with the incoming SMLT port information is sent to the control plane of node 221.

Accordingly, upon receiving reconstructed packet 207-2, the control plane of node 222 identifies packet 207-2 as being received via SMLT port 117. As a consequence, node 222 creates ARP record 232 within forwarding database 282 as if packet 207-2 were received via SMLT port 217. Line 242 represents that the ARP record 232 points to SMLT port 217 instead of IST port 227, as represented by line 242, even though ARP data packet 207-2 was received via IST port 227. In other words, the control plane of node 222 learns and creates the ARP record based on the information contained in the received ARP Request packet, and points the ARP record to the incoming SMLT port instead of the IST port. It also creates a MAC record pointing to the incoming SMLT port. Such a process removes a need for ARP and MAC record synchronization initiated by Node 221 control plane. The technical advantage of such a process, or the result of such a process, is that Nodes 221 and 222 do not need to learn MAC addresses and transmit MAC synchronization messages that would result in linear database processing. In other words, the process removes the extra step of MAC learning via synchronization. This minimizes searching and potential failure cases.

Thus, on node 221, the forwarding data unit that is attached to the incoming SMLT port passes the SMLT port ID (logical port ID number instead of a physical port number) information along with the ARP request packet to the control plane. The node 221 control plane learns and creates the ARP record based on the information contained in the received ARP Request packet, and points the ARP record to the incoming SMLT port. The node 221 control plane disables source MAC address learning of the ARP Request packets coming from SMLT ports. This action prevents sending of any MAC record messages to the other peer over IST due to ARP Request packets. The ARP record in the remote node will then already be pointing to the incoming SMLT port.

Functionality associated with synchronization manager 140 will now be discussed via flowcharts and diagrams in FIG. 3 through FIG. 5. For purposes of the following discussion, the synchronization manager 140, as shown in FIG. 6, or other appropriate entity performs steps in the flowcharts.

Figure 3:
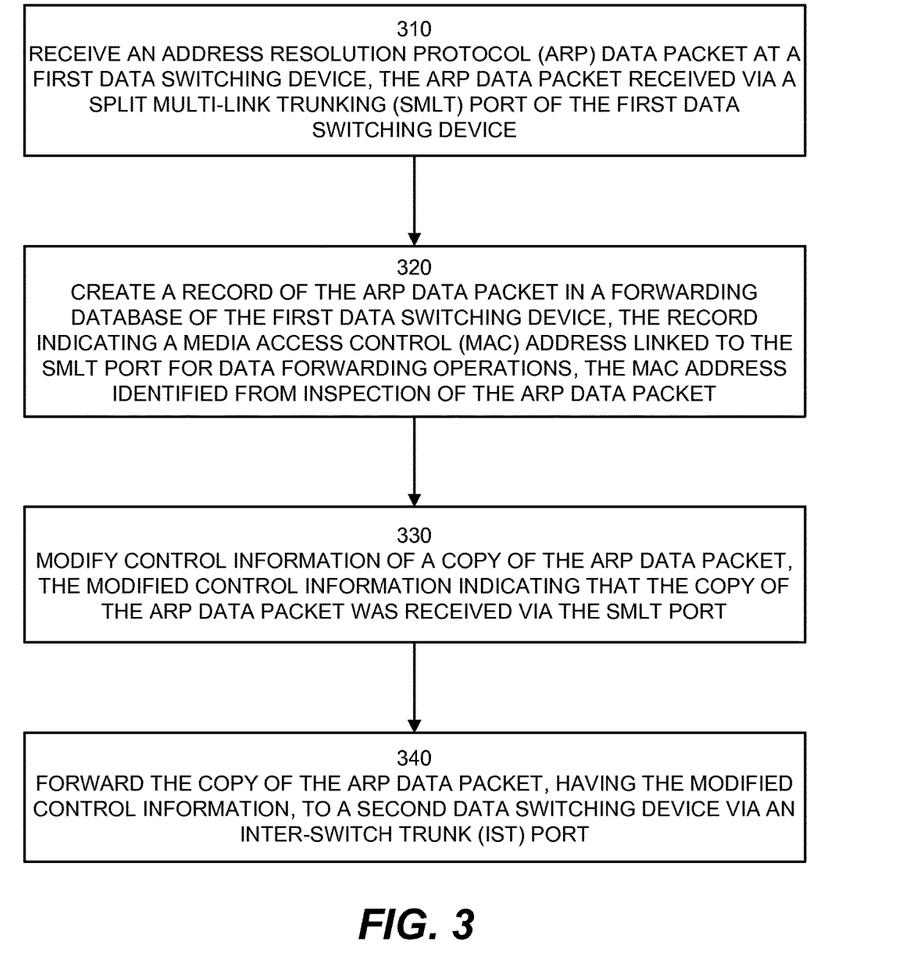
FIG. 3 is a flowchart illustrating an example of ARP synchronization according to embodiments herein.

Now describing embodiments more specifically, FIG. 3 is a flow chart illustrating embodiments disclosed herein. In step 310, synchronization manager 140 receives an Address Resolution Protocol (ARP) data packet at a first data switching device. The first data switching device can be any router, network switch, network bridge, etc., that can process data and data packets for forwarding data between any given network segment. The ARP data packet can be a request, reply, or advertised notification. The ARP data packet is received via a Split Multi-Link Trunking (SMLT) port of the first data switching device. That is, the first data switching device receives the ARP data packet from a cable/line that is a member of the SMLT port and thus has a virtual port identification as a receiving port. Note that Split Multi-Link Trunking includes SMLT, DSMLT, and RSMLT.

In step 320, the synchronization manager 140 creates a record of the ARP data packet in a forwarding database of the first data switching device. For example, as part of an ARP broadcast, a control plane of the first data switching device receives a copy of the ARP data packet for MAC address learning and updating routing tables. Accordingly, the record indicates a Media Access Control (MAC) address linked to the SMLT port for data forwarding operations. The MAC address is identified from inspection of the ARP data packet, such as by the control plane.

In step 330, synchronization manager 140 modifies control information of a copy of the ARP data packet. The modified control information indicates that the copy of the ARP data packet was received via the SMLT port. Data packets, including non-ARP data packets, have two parts: (1) control information and (2) user information. The user information includes the actual data content to be transmitted. The user information is also known as payload. The control information includes any metadata or envelope information associated with delivering and receiving the payload, such as source and destination addresses. The control information can include any headers, trailers, encapsulation data, or other information used for transmitting payload across or within a network.

In step 340, synchronization manager 140 forwards the copy of the ARP data packet, having the modified control information, to a second data switching device via an Inter-Switch Trunk (IST) port. The IST port physically connects two peer data switching devices that are part of an SMLT pair or cluster.

Figure 4:
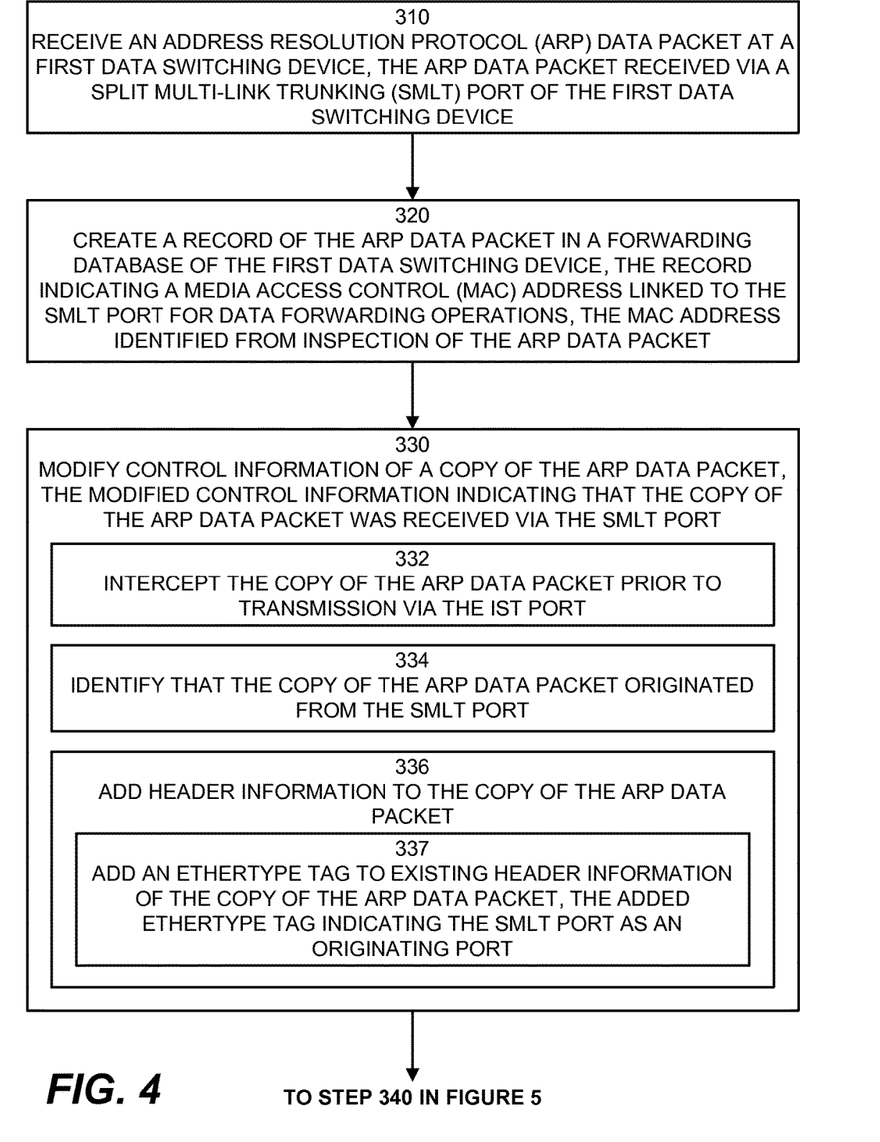
FIGS. 4-5 are a flowchart illustrating an example of ARP synchronization according to embodiments herein.
Figure 5:
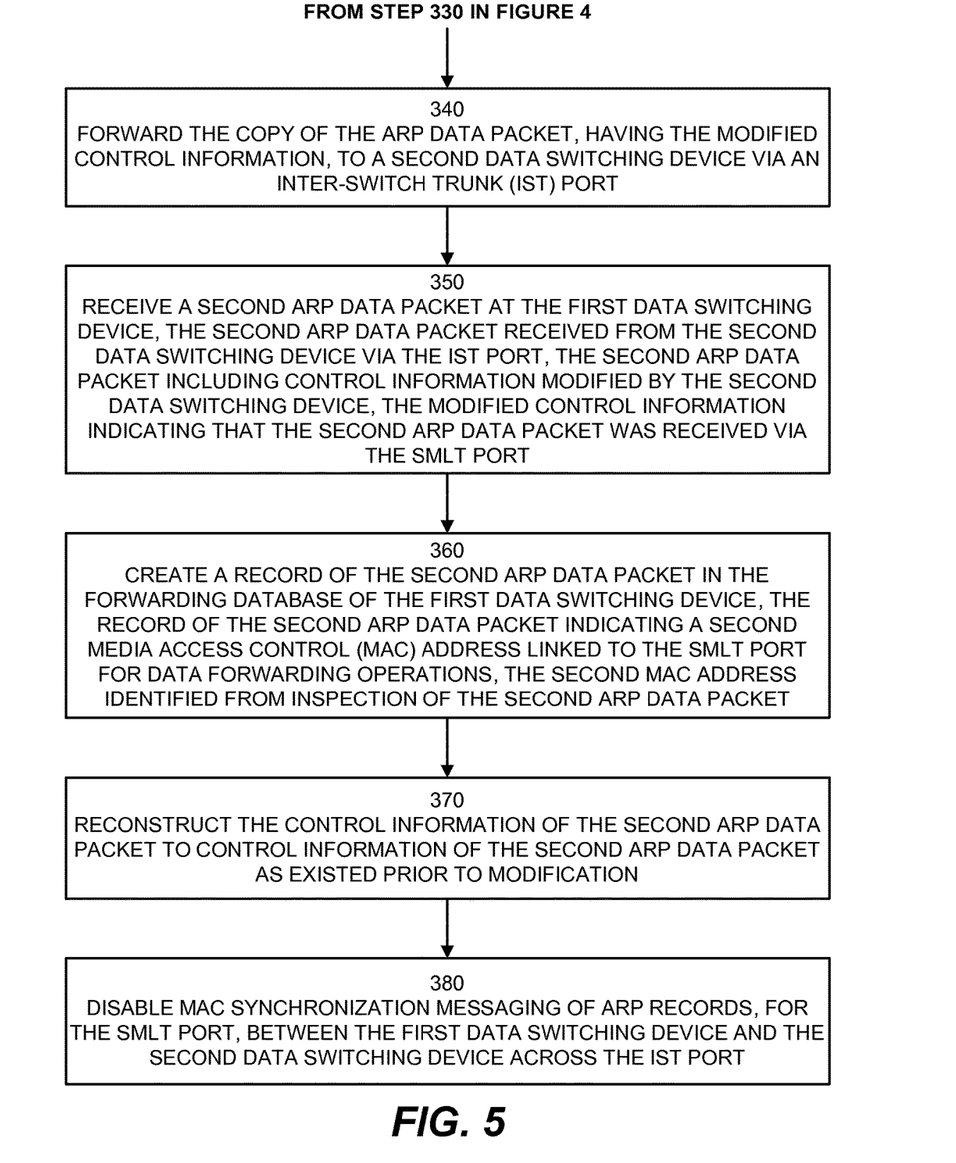
Figure 6:
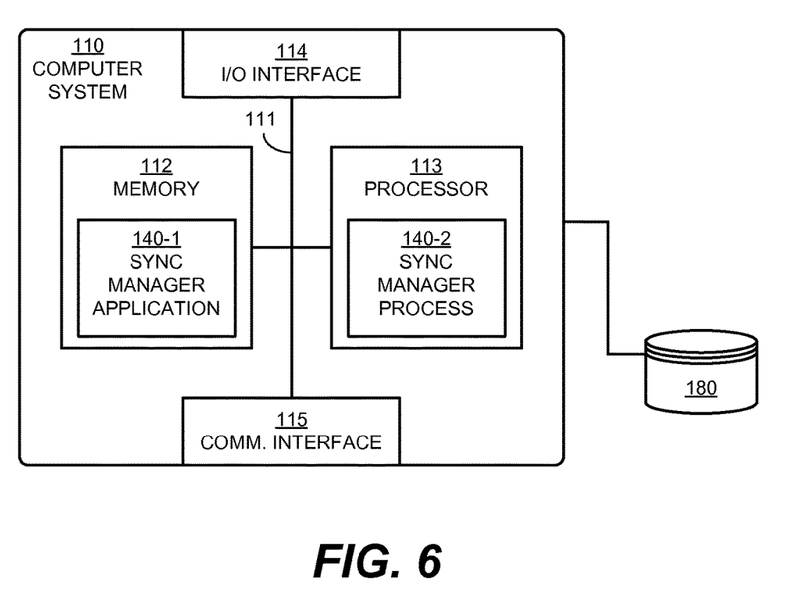
FIG. 6 is an example block diagram of a network data transport device operating in a computer/network environment according to embodiments herein.

FIGS. 4-5 include a flow chart illustrating additional and/or alternative embodiments and optional functionality of the synchronization manager 140 as disclosed herein.

In step 310, the synchronization manager 140 receives an Address Resolution Protocol (ARP) data packet at a first data switching device, the ARP data packet being received via a Split Multi-Link Trunking (SMLT) port of the first data switching device.

In step 320, the synchronization manager 140 creates a record of the ARP data packet in a forwarding database of the first data switching device. The record indicates a Media Access Control (MAC) address linked to the SMLT port for data forwarding operations. A control plane identifies the MAC address from inspection of the ARP data packet.

In step 330, the synchronization manager 140 modifies control information of a copy of the ARP data packet. The modified control information indicating that the copy of the ARP data packet was received via the SMLT port.

In step 332, the synchronization manager 140 intercepts the copy of the ARP data packet prior to transmission via the IST port.

In step 334, the synchronization manager 140 identifies that the copy of the ARP data packet originated from the SMLT port.

In step 336, the synchronization manager 140 adds header information to the copy of the ARP data packet.

In step 337, the synchronization manager 140 adds an EtherType tag, or special tag, to existing header information of the copy of the ARP data packet, the added EtherType tag indicates or points to the SMLT port as an originating port.

In step 340, the synchronization manager 140 forwards the copy of the ARP data packet, having the modified control information, to a second data switching device via an Inter-Switch Trunk (IST) port.

In step 350, the synchronization manager 140 receives a second ARP data packet at the first data switching device. The second ARP data packet is received from the second data switching device via the IST port. The second ARP data packet includes control information modified by the second data switching device. The modified control information indicates that the second ARP data packet was received via the SMLT port (albeit at the second switching device). In other words, the first data switching device receives a tagged ARP packet in a tagged/modified format like that created by the first data switching device for transmission across the IST port.

In step 360, the synchronization manager 140 creates a record of the second ARP data packet in the forwarding database of the first data switching device. The record of the second ARP data packet indicates a second Media Access Control (MAC) address linked to the SMLT port for data forwarding operations, the second MAC address being identified from inspection of the second ARP data packet.

In step 370, the synchronization manager 140 reconstructs the control information of the second ARP data packet to control information of the second ARP data packet as existed prior to modification. For example, the synchronization manager 140 removes a special tag inserted for real-time ARP synchronization.

In step 380, the synchronization manager 140 disables MAC synchronization messaging of ARP records, for the SMLT port, between the first data switching device and the second data switching device across the IST port. For example, the record created of the second ARP data packet in the forwarding database of the first switching device points to the SMLT port in lieu of the IST port, thus no dedicated or separate control messaging is needed for synchronization of ARP records.

In another embodiment, the second switching device receives the copy of the ARP data packet, having the modified control information, at the second data switching device via the IST port. In response, the second data switching device creates a record of the copy of the ARP data packet in a forwarding database of the second data switching device. The record of the copy of the ARP data packet indicates the Media Access Control (MAC) address linked to the SMLT port for data forwarding operations, wherein the MAC address is identified from inspection of the copy of the ARP data packet. The second data switching device also reconstructs the control information of the copy of ARP data packet, modified by the first data switching device, to control information as existed prior to modification. The record created of the copy of ARP data packet in the forwarding database of the second switching device then points to the SMLT port in lieu of the IST port.

FIG. 6 shows an example physical embodiment according to techniques disclosed herein. In FIG. 6, computer system 110 is shown for executing a synchronization manager 140 process either automatically, or in response to user input. Repository 180 can optionally be used for storing client data both before and after processing.

Note that the following discussion provides a basic embodiment indicating how to carry out functionality associated with the synchronization manager 140 as discussed above and below. It should be noted, however, that the actual configuration for carrying out the synchronization manager 140 can vary depending on a respective application. For example, as previously discussed, computer system 110 can include one or multiple computers that carry out the processing as described herein.

In different embodiments, computer system 110 may be any of various types of devices, including, but not limited to, a network switch, a router, a wireless access point, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

As shown, computer system 110 of the present example includes an interconnect 111 that couples a memory system 112, a processor 113, I/O interface 114, and a communications interface 115.

I/O interface 114 provides connectivity to any peripheral devices such as a keyboard, selection tool to move a cursor, display screen, etc.

Communications interface 115 enables the synchronization manager 140 of computer system 110 to communicate over a network and, if necessary, retrieve any data required to create views, process content, communicate with a user, etc. according to embodiments herein.

As shown, memory system 112 is encoded with synchronization manager 140-1 that supports functionality as discussed above and as discussed further below. Synchronization manager 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the synchronization manager 140-1. Execution of the synchronization manager 140-1 produces processing functionality in synchronization manager process 140-2. In other words, the synchronization manager process 140-2 represents one or more portions of the synchronization manager 140 performing within or upon the processor 113 in the computer system 110.

It should be noted that, in addition to the synchronization manager process 140-2 that carries out method operations as discussed herein, other embodiments herein include the synchronization manager 140-1 itself (i.e., the un-executed or non-performing logic instructions and/or data). The synchronization manager 140-1 may be stored on a tangible (non-transitory) computer readable storage medium including computer readable storage media such as floppy disk, hard disk, optical medium, etc. According to other embodiments, the synchronization manager 140-1 can also be stored in a memory type system such as in firmware, read only memory (ROM), or, as in this example, as executable code within the memory system 112.

In addition to these embodiments, it should also be noted that other embodiments herein include the execution of the synchronization manager 140-1 in processor 113 as the synchronization manager process 140-2. Thus, those skilled in the art will understand that the computer system 110 can include other processes and/or software and hardware components, such as an operating system that controls allocation and use of hardware resources, or multiple processors.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A method comprising:
    receiving an Address Resolution Protocol (ARP) data packet at a first data switching device, the ARP data packet received via a Split Multi-Link Trunking (SMLT) port of the first data Switching device;
    creating a record of the ARP data packet in a forwarding database of the first data switching device, the record indicating a Media Access Control (MAC) address linked to the SMLT port for data forwarding operations, the MAC address identified from inspection of the ARP data packet;
    modifying control information of a copy of the ARP data packet, the modified control information indicating that the copy of the ARP data packet was received via the SMLT port;
    forwarding the copy of the ARP data packet, having the modified control information, to a second data switching device via an Inter-Switch Trunk (IST) port;
    receiving a second ARP data packet at the first data switching device, the second ARP data packet received from the second data switching device via the IST port, the second ARP data packet including control information modified by the second data switching device, the modified control information indicating that the second ARP data packet was received via the SMLT port;
    creating a record of the second ARP data packet in the forwarding database of the first data switching device, the record of the second ARP data packet indicating a second Media Access Control (MAC) address linked to the SMLT port for data forwarding operations, the second MAC address identified from inspection of the second ARP data packet; and
    reconstructing the control information of the second ARP data packet to control information of the second ARP data packet as existed prior to modification.

2. The method of claim 1, wherein the record created of the second ARP data packet in the forwarding database of the first switching device points to the SMLT port in lieu of the IST port.

3. The method of claim 1, wherein modifying control information of the copy of the ARP data packet comprises:
    intercepting the copy of the ARP data packet prior to transmission via the IST port;
    identifying that the copy of the ARP data packet originated from the SMLT port; and
    adding header information to the copy of the ARP data packet.

4. The method of claim 3, wherein adding header information to the copy of the ARP data packet comprises adding an EtherType tag to existing header information of the copy of the ARP data packet, the added EtherType tag indicating the SMLT port as an originating port.

5. The method of claim 1, further comprising disabling MAC synchronization messaging of ARP records, for the SMLT port, between the first data switching device and the second data switching device across the IST port.

6. A computer system for data packet switching, the computer system comprising:
    a processor; and
    a memory coupled to the processor, the memory storing instructions that, when executed by the processor, cause the system to perform the operations of:
        receiving an Address Resolution Protocol (ARP) data packet at a first data switching device, the ARP data packet received via a Split Multi-Link Trunking (SMLT) port of the first data switching device;
        creating a record of the ARP data packet in a forwarding database of the first data switching device, the record indicating a Media Access Control (MAC) address linked to the SMLT port for data forwarding operations, the MAC address identified from inspection of the ARP data packet;
        modifying control information of a copy of the ARP data packet, the modified control information indicating that the copy of the ARP data packet was received via the SMLT port;
        forwarding the copy of the ARP data packet, having the modified control information, to a second data switching device via an Inter-Switch Trunk (IST) port;
        receiving a second ARP data packet at the first data switching device, the second ARP data packet received from the second data switching device via the IST port, the second ARP data packet including control information modified by the second data switching device, the modified control information indicating that the Second ARP data packet was received via the SMLT port;
        creating a record of the second ARP data packet in the forwarding database of the first data switching device, the record of the second ARP data packet indicating a second Media Access Control (MAC) address linked to the SMLT port for data forwarding operations, the second MAC address identified from inspection of the second ARP data packet; and disabling MAC synchronization messaging of ARP records, for the SMLT port, between the first data switching device and the second data switching device across the IST port; and
        reconstructing the control information of the second ARP data packet to control information of the second ARP data packet as existed prior to modification.

7. The computer system of claim 6, wherein the record created of the second ARP data packet in the forwarding database of the first switching device points to the SMLT port in lieu of the IST port.

8. The computer system of claim 6, wherein modifying control information of the copy of the ARP data packet comprises:

intercepting the copy of the ARP data packet prior to transmission via the IST port;

identifying that the copy of the ARP data packet originated from the SMLT port; and adding header information to the copy of the ARP data packet including adding an EtherType tag to existing header information of the copy of the ARP data packet, the added Ether Type tag indicating the SMLT port as an originating port.

9. A method comprising:

receiving an Address Resolution Protocol (ARP) data packet at a first data switching device, the ARP data packet received via a Split Multi-Link Trunking (SMLT) port of the first data switching device;

creating a record of the ARP data packet in a forwarding database of the first data switching device, the record indicating a Media Access Control (MAC) address linked to the SMLT port for data forwarding operations, the MAC address identified from inspection of the ARP data packet;

modifying control information of a copy of the ARP data packet, the modified control information indicating that the copy of the ARP data packet was received via the SMLT port;

forwarding the copy of the ARP data packet, having the modified control information, to a second data switching device via an Inter-Switch Trunk (IST) port;

receiving the copy of the ARP data packet, having the modified control information, at the second data switching device via the IST port;

creating a record of the copy of the ARP data packet in a forwarding database of the second data Switching device, the record of the copy of the ARP data packet indicating the Media Access Control (MAC) address linked to the SMLT port for data forwarding operations, the MAC address identified from inspection of the copy of the ARP data packet; and reconstructing the control information of the copy of ARP data packet, modified by the first data switching device, to control information as existed prior to modification.

10. The method of claim 9, wherein the record created of the copy of ARP data packet in the forwarding database of the second switching device points to the SMLT port in lieu of the IST port.

11. The method of claim 9, wherein modifying control information of the copy of the ARP data packet comprises:

intercepting the copy of the ARP data packet prior to transmission via the IST port;

identifying that the copy of the ARP data packet originated from the SMLT port; and adding header information to the copy of the ARP data packet.

12. The method of claim 11, wherein adding header information to the copy of the ARP data packet comprises adding an EtherType tag to existing header information of the copy of the ARP data packet, the added EtherType tag indicating the SMLT port as an originating port.

13. The method of claim 9, further comprising disabling MAC synchronization messaging of ARP records, for the SMLT port, between the first data switching device and the second data switching device across the IST port.

* * * * *